Feb. 24, 1948.  C. C. SLATE  2,436,405
MEANS FOR ENGAGING AND HOISTING BOMBS AND OTHER OBJECTS
Filed Sept. 16, 1942
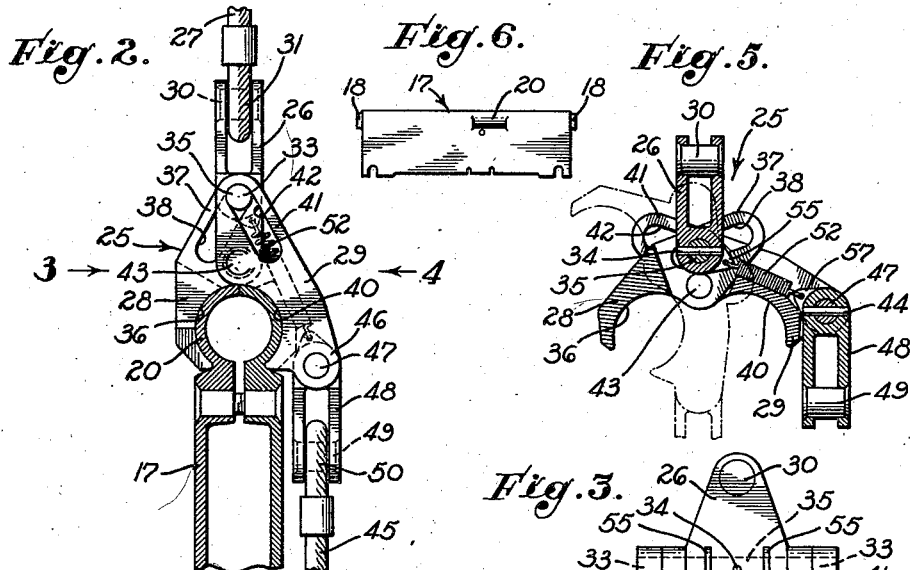
INVENTOR
CLAUDE C. SLATE
BY
HARRIS, KIECH, FOSTER & HARRIS
Clarence F. Kiech
FOR THE FIRM
ATTORNEYS.

Patented Feb. 24, 1948

2,436,405

UNITED STATES PATENT OFFICE 2,436,405

MEANS FOR ENGAGING AND HOISTING BOMBS AND OTHER OBJECTS

Claude C. Slate, Burbank, Calif., assignor to Hughes Tool Company, Houston, Tex., a corporation of Delaware Application September 16, 1942, Serial No. 458,605

20 Claims. (Cl. 89—1.5)

My invention relates to hoisting devices, with special reference to instrumentalities for releasably engaging objects to be lifted. The invention is being initially embodied in means especially designed for hoisting aerial bombs into bomb racks of aircraft and will be so described for the purpose of this disclosure. From my description it will be apparent to those skilled in the art that the invention may be applied with utility to other purposes in various fields.

Aerial bombs are provided with metal loops or eyes on their peripheries, by means of which the bombs are supported in the aircraft bomb rack, remote control being provided to release the bombs. The bombs are lifted by slings to elevated points in the bomb bay of the aircraft for engagement with the bomb-releasing mechanism, and such engagement must be performed manually by members of the loading crew. Usually the opposite ends of the bomb-carrying slings are attached to two independent hoisting cables so that the cables may be moved relative to each other to cause a bomb to rotate into the position required for engagement with the bomb rack mechanism. It will be readily appreciated that such a bomb loading procedure is hazardous, especially since the bombs commonly weigh more than half a ton. In addition to being hazardous, the procedure is time-consuming since the bomb slings must be adjusted with care and since so many steps in the loading procedure must be performed manually.

The general object of my invention is to provide a safe, convenient, and labor-saving means for loading bombs in aircraft whereby a bombing plane may be loaded in a safer manner, in a shorter time, and with a smaller crew than heretofore possible.

With reference to safety, I propose to substitute for the usual slings a positively acting engagement-means of exceptional mechanical efficiency with inherent safety features, and I further propose to eliminate the hazardous necessity for any member of the loading crew standing under a suspended bomb at any time or even the necessity of entering the bomb bay while the bomb is being hoisted into place.

Objects of my invention relating to convenience and labor saving include the following: to provide a clamp designed to remain in gripping engagement with a bomb in response to the bomb load; to provide spring-actuated automatic release of such a clamp when the clamp is relieved of the bomb weight; to provide automatic means for securing a bomb to a bomb rack in combination with means for automatically releasing the bomb from the hoist when the bomb is so secured, whereby the loading of the bomb may be performed by merely manipulating the hoist means; to provide means in combination with a bomb-hoisting clamp by virtue of which the bomb may be rotated to any desired position relative to a bomb rack in the course of hoisting; and to provide a single gripping device adapted for connection to one cable to hoist a bomb and for connection to another cable for rotating the suspended bomb.

My copending application, Serial No. 405,010, filed August 1, 1941, teaches how a portion of the control mechanism for release of a bomb in flight may be incorporated in a shackle that is adapted on one hand for releasable engagement with the bomb and on the other hand for releasable engagement with the bomb rack. The shackle is adapted to be automatically latched in place in the bomb rack when manipulated in a simple manner by the hoisting mechanism, and when so latched is adapted to automatically enter into operative relationship with the portion of the firing control mechanism that is permanently built into the rack. The present invention combines with such a shackle a special clamp or hoisting instrument that is intended to be attached to a cable and is adapted to be released automatically whenever the weight of the bomb is transferred from the hoist cable to the bomb rack. In the loading procedure made possible by the present invention it is not even necessary for a workman to enter the bomb bay to cause the hoist cable to be disengaged from a newly mounted bomb.

The above and other objects and advantages of the invention will be apparent from the following detailed description, taken with the accompanying drawing.

In the drawing, which is to be considered as illustrative only:

Fig. 1 is a sectional view through the bomb bay of an airplane showing one stage in the procedure of loading bombs in accord with the present invention, a portion of the bomb rack being broken away;

Fig. 2 is a side elevation of my new hoisting clamp in engagement with a bomb shackle, the bomb shackle being shown in cross section;

Fig. 3 is a side elevation of the closed clamp taken as indicated by the arrow 3 in Fig. 2;

Fig. 4 is a similar view from the opposite side taken as indicated by the arrow 4 in Fig. 2;

Fig. 5 is a sectional view of the hoisting clamp in open position; and

Fig. 6 is a side elevation on a reduced scale of the bomb shackle designed for use with the clamp.

Fig. 1 shows the bomb bay 10 of an airplane 11 equipped with a bomb rack comprising two frames generally designated 12 on opposite sides of the bomb bay. Each of the frames 12 comprises a pair of parallel rails 13 that serve not only as frame elements but also as tracks for guiding the bombs 15 to their mounted positions. Sheet metal walls 14 on the sides of the rail cover latching mechanism and control mechanism associated with the bomb rack. Each of the bombs has a pair of spaced metal loops 16 that are releasably engaged by one of my bomb shackles 17.

The bomb shackle 17, which may be constructed as taught in my copending application, Serial No. 405,010, filed August 1, 1941, is in the form of a flat housing with a lug or trunnion 18 at each of its opposite ends and with a portion 20 of cylindrical configuration at its upper edge. When a bomb 15 is lifted in the bomb bay by suitable means, the lugs or trunnions 18 on the opposite ends of the accompanying bomb shackle 17 are placed in sliding engagement with cooperating guide channels in the rails 13. In the course of upward movement the lugs or shackle trunnions 18 are free to pass through bomb stations in the bomb rack, but any attempt to move the shackle trunnions downward past a bomb station results in supporting engagement of the shackle at the station. Thus the broken portion of Fig. 1 shows a pivoted spring-actuated latch member 21 extending across a guide channel 22 in supporting engagement with a lug 18 of a bomb shackle.

Fig. 2 shows a hoisting instrument or clamp generally designated 25 gripping the cylindrical portion 20 of a bomb shackle 17, and Figs. 3, 4 and 5 show other views of the same clamp. The hoisting clamp 25 includes a support member 26 adapted for attachment to a hoist cable 27 and includes a pair of jaws 28 and 29 that are pivotally interconnected for relative rotation about the axis X—X. The support member 26 may be in the form of a clevis carrying a cross pin 30 that passes through an eye or loop 31 formed on the end of the cable 27, and in the preferred form of my invention provides a pair of coaxial pivot means for cooperation with the two jaws 28 and 29. In the depicted construction the two coaxial pivot means are the opposite ends 33 of a suitable pivot pin 35 that extends through the support member and is retained therein by a dowel 34.

The jaw 28, which is formed with an arcuate gripping face 36, has two spaced parallel webs or arms 37, the two arms having longitudinal slots 38 in sliding engagement with the two ends 33, respectively, of the pivot pin 35. In like manner the other jaw 29 of the clamp is formed with an arcuate gripping face 40 and has two spaced parallel webs or arms 41, the two arms having longitudinal slots 42 in sliding engagement with the opposite ends 33, respectively, of the pivot pin 35. To pivotally interconnect the two jaws 28 and 29 for relative rotation about the axis X—X, a pair of suitable pins 43 may be employed on each side of the clamp, each pin interconnecting one of the arms 37 of the jaw 28 and one of the arms 41 of the jaw 29.

Since any load gripped by the two jaws 28 and 29 is transmitted to the support member 26 through the pivot pin 35, the pivot pin tends to take a position at the upper ends of the slots 38 and 42. As may be readily understood from the drawing, any movement upward of the pivot pin 35 away from the axis X—X causes closing rotation of the two jaws 28 and 29 about that axis. In other words, once the clamp 25 is in weight-supporting grip with a bomb shackle 17, the two jaws tend to grip the shackle in response to the weight of the load. It is to be noted in Fig. 2 that the slots 38 and 42 intersect at a relatively acute angle to favor a gripping force of relatively high magnitude in opposition to the load, so that the gripping force of the jaws clearly exceeds any tendency of the load to spread the jaws apart.

It will be apparent that some practices of the invention may be carried out with the means described to this point, but I prefer to add two refinements, the first refinement being means for attaching a second hoist cable 45 to the clamp for the purpose of rotating a bomb to various positions in the course of the hoisting operation, and the second refinement being yielding means to urge the clamp 25 continuously to open position.

For the purpose of attaching the second cable 45 to the clamp, I may provide a pair of spaced ears 46 on the lower edge of the jaw 29 to carry a second pivot pin 47. Between the ears 46 the pivot pin 47 is embraced by a cable-connecting member 48 and retained therein by a dowel 44. This cable-connecting member 48 may be similar in construction to the support member 26, being in the form of a clevis carrying a cross pin 49 for engagement by an eye or loop 50 on the end of the second hoist cable 45.

Any suitable yielding means arranged in any operative manner may be employed to create the desired tendency for the two jaws 28 and 29 to open. Preferably the opening tendency is provided by spring means effective between the support member 26 and one of the two jaws 28 and 29. In the present arrangement I provide two helical springs 52 that extend in tension between the two pivot pins 35 and 47. As best shown in Fig. 4, the support member 26 has two slots 53 to provide clearance for a pair of small plates or clips 55 that are apertured to embrace the first pivot pin 35. In like manner the lower cable-connecting member 48 has similar slots 56 to receive similar clips 57 that are apertured to embrace the second pivot pin 47. The four clips 55 and 57 are apertured to receive the hooked ends of the pair of helical springs 52.

Since the two springs 52 tend to move the jaw 29 toward the pivot pin 35 to place the inner ends of the slots 42 against the pivot pin, and since the two jaws 28 and 29 are rotatably interconnected by the two pins 43, the effect of the spring action is to urge the two jaws to the open positions indicated in Fig. 5. It is contemplated that the springs will be strong enough to cause such an opening action whenever the two jaws are released from the weight of a bomb. When the two jaws initially open for disengagement from a bomb shackle 17 and spread apart from each other, as indicated in Fig. 5, the two jaws become unbalanced about the supporting axis of the pivot pin 35. The unbalance is caused by the weight of the cable-connecting member 48 together with whatever load is imposed thereon by the second cable 45. As a result of such unbalance, the open jaws 28 and 29 rotate in a unitary manner about the pivot pin 35 to the positions indicated by dotted lines in Fig. 5. It is important to note that such rotation of approximately a quarter turn narrows the space occupied by the open jaws to permit the clamp to move downward vertically through relatively narrow spaces after a bomb is mounted.

The manner in which the described means may be employed in loading bombs may be readily understood by referring to Fig. 1. Preparatory to lifting a bomb 15, a bomb shackle 17 is snapped into engagement with the bomb, and a member of the ground crew manually closes the clamp 25 into gripping engagement with the cylindrical portion 20 of the bomb shackle and holds the clamp closed until a sufficient portion of the weight of the bomb is transmitted to the clamp to hold the clamp closed. While, as indicated heretofore, the springs 52 are not necessary in all practices of my invention, one advantage of using such springs is that the resistance they provide to manual closing of the two jaws has the effect of causing or reminding the operator to close the jaws firmly on the bomb shackle.

When the bomb is initially lifted clear of the ground by the first hoist cable 27, the bomb is then elevated somewhat higher by the first hoist cable to permit the shackle trunnions 18 to slidingly engage the rails 13 of the bomb rack. From this point, beginning with the bomb relatively close to the ground, the loading procedure may be carried out without any necessity for touching the bomb or manually manipulating any of the associated devices.

The first step is to take up the slack in the second cable 45 and then cause the second cable to rotate the bomb to the position shown in Fig. 1. After the bomb is thus tilted to the desired position to clear the lower end of the bomb rack rails 13, both cables 27 and 45 are hoisted simultaneously until the shackle trunnions 18 are carried just above a desired latching station whereupon both cables may be simultaneously lowered. As soon as the descending bomb shackle is stopped by engagement with the latch member 21 at the bomb station, the load of the bomb is transmitted from the cable 27 to the bomb rack and immediately the springs 52 automatically open the hoist clamp 25, whereupon the open jaws automatically rotate in the manner previously described to occupy a relatively narrow space. Continued lowering of the two cables returns the hoist clamp 25 to the ground for engagement with the next succeeding shackle 17 of the next succeeding bomb.

It will be noted that while the clamp 25 is described as comprising a single pair of jaws, the clamp has certain dual aspects in the interest of safety, and may be considered as comprising two pairs of jaws. Thus there are two separate arms 37 or 41 for each jaw, two separate sets of slots 38 and 42 for each jaw, two separate pins 43 for pivotally interconnecting the jaws, and two ends 33 of the pivot pin 35 for automatically holding the jaws closed. It is apparent that various parts of the clamp may fail without causing the clamp to drop a bomb.

The preferred practice of my invention described herein in specific detail for the purpose of disclosure and to teach the principles involved will suggest to those skilled in the art various changes and substitutions under my basic concept. I reserve the right to all such departures from my description that lie within the scope of my appended claims.

I claim as my invention:

1. A hoisting implement of the character described, comprising: support means; a pair of jaws pivotally interconnected for opening and closing movement about a pivot axis, each of said jaws having a portion extending beyond said axis and having a slot in said portion, said slots of the two jaws crossing each other and being in sliding engagement with said support means whereby a hoist load imposed on said support means by the two jaws tends to hold the jaws closed; and elastic means interconnecting said support means and one of said jaws to urge said two jaws to open position.

2. A hoisting implement of the character described, comprising: a support means; a pair of jaws pivotally interconnected for opening and closing movement about a pivot axis, each of said jaws having a portion extending beyond said axis and having a slot in said portion, said slots of the two jaws crossing each other and being in sliding engagement with said support means whereby a hoist load imposed on said support means by the two jaws tends to hold the jaws closed; and yielding means connecting said support means with a point on one of said jaws, said yielding means being effective in the general direction of the slot on said one jaw to tend to draw toward the support means that end of said slot closest to said pivot axis, thereby to urge the two jaws to open position in opposition to the load transmitted by the jaws at said support means.

3. A hoisting implement for cooperation with a hoist means, comprising: a support means adapted for connection with said hoist means, said support means providing two coaxial pivots; a first jaw having two spaced pivot arms, said arms having slots in sliding engagement with said pivots respectively; and a second jaw pivotally connected with said first jaw to cooperate therewith for gripping action, said second jaw having two spaced arms with slots in sliding engagement with said two pivots respectively, whereby pairs of intersecting slots cooperate with each of said pivot means to hold the jaws closed in response to loads carried by the jaws.

4. A hoisting implement for cooperation with a hoist means, comprising: a support means adapted for connection with said hoist means, said support means providing two coaxial pivots; a first jaw having two spaced pivot arms, said arms having slots in sliding engagement with said pivots respectively; a second jaw pivotally connected with said first jaw to cooperate therewith for gripping action, said second jaw having two spaced arms with slots in sliding engagement with said two pivots respectively, whereby pairs of intersecting slots cooperate with each of said pivot means to hold the jaws closed in response to loads carried by the jaws; and yielding means to urge said jaws open whereby the jaws open automatically whenever the jaws are relieved of the weight of a load.

5. A hoisting implement as set forth in claim 3 in which one of said jaws is weighted to cause the hoisting implement to rotate about said two pivots when the two jaws are relieved of a load.

6. A hoisting device comprising: a support means adapted to be lifted; a first pivot pin carried by said support means; a first jaw having two spaced pivot arms, said arms having slots in sliding engagement with said first pivot pin; a second jaw pivotally connected with said first jaw to cooperate therewith for gripping action, said second jaw having two spaced arms with slots in sliding engagement with said first pivot pin, the slots of the two jaws providing cam surfaces cooperating with said first pivot pin to hold the jaws closed in response to the weight of a load gripped by the jaws; a second pin carried by one of said jaws; and spring means interconnecting said first and second pins to urge the two jaws to open position.

7. In a hoisting device for hoisting and retaining in hoisted position an object, the combination of: an upright rack providing guide means for guiding the object during hoisting; retaining means for supporting said object in said rack when hoisted to a position adjacent said retaining means; and means for hoisting said object in said rack to said position and for then automatically disengaging same, said last-named means including a pair of jaws, means for connecting said jaws to move relative to each other from an open position to a closed position, said jaws when in closed position acting to engage a portion of said object in object-lifting relationship and when in open position to disengage said object, a support member, and jaw-operating means operatively connecting said jaws to said support member, said jaw-operating means including means for moving said jaws toward closed position in response to lifting of said support member whereby lifting of said support member will hoist said object along said rack to said retaining means, said jaw-operating means including means for moving said jaws into open position when the weight of said object is transferred to said retaining means.

8. A combination as defined in claim 7, including resilient means for biasing said jaws toward open position, and in which said jaws are manually movable from open position to closed position against the biasing action of said resilient means to engage said jaws with said object preparatory to hoisting, said resilient means exerting a sufficient biasing force on said jaws to move same into open position when the weight of said object is transferred to said retaining means.

9. A combination as defined in claim 7, including resilient means for biasing said jaws toward open position, said resilient means exerting a sufficient biasing force on said jaws to move same into open position when the weight of said object is transferred to said retaining means whereby said jaws remain in open position when lowered from the vicinity of the object when supported by said retaining means, said jaws providing a substantially-downward-facing mouth for receiving said portion of said object, and including means for moving both of said jaws when in open position to such position that said mouth faces substantially sideward.

10. In a bomb hoisting means, the combination of: a shackle means detachably connectable to a bomb to be hoisted; an upright bomb rack providing a guide means for said shackle means and providing a retaining means for supporting said shackle means in said bomb rack at a predetermined elevation; and means for hoisting said shackle means into said bomb rack to engage said retaining means and for automatically releasing said shackle means only when safely supported in said rack by said retaining means, said hoisting means including a pair of jaws adapted for engagement with said shackle means for lifting same relative to said bomb rack while attached to a bomb, means responsive to the bomb load imposed on said jaws to hold said jaws in positive non-releasing engagement with said shackle means during lifting of said bomb, and means for automatically moving said jaws into an open shackle-releasing position when the weight of said bomb is transferred to the retaining means of said bomb rack.

11. In a bomb-hoisting means, the combination of: a shackle means detachably connectable to a bomb to be hoisted; a bomb rack adapted to receive said shackle means and providing a retaining means adapted to support said shackle means and attached bomb; and means for hoisting said shackle means and attached bomb to said retaining means and for then automatically disengaging said shackle means; said last-named means including a pair of jaws, means for connecting said jaws to move relative to each other from an open shackle-receiving position to a closed shackle-retaining position in which said jaws engage said shackle means in lifting relationship; a support member, and jaw-operating means operatively connecting said jaws to said support member; said jaw-operating means including means for moving said jaws toward closed position in response to lifting of said support member relative to said jaws and for moving said jaws into open shackle-releasing position when the weight of said shackle means and its connected bomb is transferred to said retaining means.

12. In a bomb-hoisting means, the combination of: a bomb rack; means for lifting a bomb relative to said bomb rack, said means including a support means, a pair of bomb-supporting jaws, and means for pivoting said jaws for opening and closing movement, each of said jaws having a portion providing a slot, said slots of the two jaws crossing each other and being in sliding engagement with said support means whereby upward movement of said support means tends to close said jaws; a sling comprising a cable passing downwardly beneath the bomb to be hoisted, said cable providing two upwardly-extending portions; and means for moving one upwardly-extending portion relative to the other upwardly-extending portion while at least a portion of the weight of said bomb is carried by said support means to cause said sling to support at least a portion of the weight of said bomb.

13. A combination as defined in claim 12, in which the bomb to be lifted is attached to a shackle and in which said jaws are detachably connected to said shackle whereby the bomb and shackle tend to hang from said support means, and in which one of said upwardly-extending portions of said cable is disposed to one side of said bomb rack whereby upward movement of this upwardly-extending portion will swing said bomb relative to said support means.

14. In combination with a bomb rack, a hoisting device for lifting a shackle-equipped bomb into said rack, including: a clamp means detachably connected to said shackle; a first hoisting member connected to said clamp means and being vertically movable to lift said shackle-equipped bomb, said shackle and bomb tending to hang in a position vertically below said clamp means; and a second hoisting member passing beneath said bomb as a sling therefor and providing one end portion on one side of the bomb fixedly connected to said clamp means and another end portion on the other side of said bomb whereby lifting of said other end portion will at least partially support said bomb by said sling and swing same to one side of said position vertically below said clamp means.

15. A combination as defined in claim 14, in which said clamp means includes a pair of jaws adapted to receive said shackle, means for resiliently urging said jaws toward an open shackle-releasing position, and means responsive to upward movement of said first hoisting member relative to said bomb for moving said jaws toward closed shackle-retaining position.

16. In a hoisting device for hoisting and retaining in hoisted position a body and a shackle connected thereto, the combination of: an upright guide means for receiving and guiding said shackle; a clamp detachably connected to said shackle; a first hoisting member providing one end attached to said clamp in supporting relationship and providing an operating end portion above said clamp; a second hoisting member passing beneath said body as a sling and providing an end portion on one side of said body and attached to said clamp, said second hoisting member providing an operating end portion extending upwardly on the opposite side of said body; means for pulling said operating end portions of said hoisting members to raise said shackle and body with respect to said guide means, said shackle being guided by said guide means during such raising; a retaining means for retaining said body and said shackle in hoisted position; and means for automatically disengaging said clamp from said shackle when the weight of said body and said shackle is supported by said retaining means.

17. In a hoisting device for hoisting and retaining in hoisted position a body and a shackle connected thereto and extending from one side thereof, the combination of: an upright rack providing guide means having a lower end adapted to receive said shackle, said guide means being adapted to guide said shackle in its upward movement; a clamp detachably engageable with that end of said shackle farthest from said body whereby lifting of said clamp will move said shackle into the lower end of said guide means with said body below said rack; a first hoisting member connected to said clamp for raising said clamp and its attached shackle and body; a second hoisting member passing beneath said body to form a sling therefor; means for operating said second hoisting member when said shackle has entered the lower end of said guide means to move said body from its position below said rack to a position to one side of said rack whereby said shackle can thereafter be moved upward along said guide means by upward force applied to said first hoisting member, said body remaining on said one side of said upright rack during such upward movement; retaining means associated with said upright rack for retaining said end of said shackle in hoisted position; and means for releasing said clamp from said shackle when the weight of the body and the shackle is transferred to the retaining means.

18. In a hoisting device, the combination of: a vertically movable support member providing two coaxial pivot means extending therefrom; a first jaw providing a gripping face and two spaced arms having parallel longitudinal slots respectively slidably receiving said two coaxial pivot means; a second jaw providing a gripping face and two spaced arms having parallel longitudinal slots respectively slidably receiving said two coaxial pivot means, said gripping faces cooperating in defining a mouth adapted to receive the object to be gripped; means for pivoting said jaws together on an axis below said coaxial pivot means, the longitudinal slots of the arms of the first jaw extending angularly across the longitudinal slots of the arms of the second jaw whereby movement of said support member relative to said axis moves said coaxial pivot means relative to said axis to move said coaxial pivot means along said slots and move said gripping faces toward and away from each other; and a connection member attached to said first jaw to one side of a line joining said axis and said coaxial pivot means whereby a downward force applied to said connection member will swing said jaws sidewise while pivoting about said coaxial pivot means so that said mouth faces sidewise.

19. A combination as defined in claim 18, including yielding means for urging said jaws to move in a direction separating said gripping faces to maintain said mouth open when a downward force applied to said connection member swings said jaws sidewise.

20. A combination as defined in claim 18, including a sling member attached at one end to said connection member and adapted to extend downward beneath the body to be hoisted and thence upward to provide an upwardly-extending portion, and including means for drawing upward on said upwardly-extending portion to exert a downward force on said connection member.

CLAUDE C. SLATE.

REFERENCES CITED

The following references are of record in the file of this patent:

UNITED STATES PATENTS

| Number | Name | Date |
|---|---|---|
| 1,980,375 | Bradshaw | Nov. 13, 1934 |
| 2,193,139 | Monteith et al. | Mar. 12, 1940 |
| 1,045,804 | Bacon et al. | Dec. 3, 1912 |
| 2,305,054 | Ash | Dec. 15, 1942 |
| 51,325 | Latham | Dec. 5, 1865 |

FOREIGN PATENTS

| Number | Country | Date |
|---|---|---|
| 497,090 | Great Britain | Dec. 7, 1938 |
| 347,363 | Great Britain | Apr. 30, 1931 |
| 430,919 | France | Aug. 26, 1911 |
| 269,858 | Germany | Feb. 3, 1914 |
| 406,477 | Great Britain | Mar. 1, 1934 |
| 367,975 | Germany | Jan. 30, 1923 |
| 490,028 | Great Britain | July 29, 1938 |